United States Patent [19]

Rychnovsky

[11] 3,927,850
[45] Dec. 23, 1975

[54] LIFTING PARACHUTE
[75] Inventor: Raymond E. Rychnovsky, Livermore, Calif.
[73] Assignee: The United States of America as represented by The United States Energy Research and Development Administration, Washington, D.C.
[22] Filed: Dec. 31, 1974
[21] Appl. No.: 537,810

[52] U.S. Cl. ............................................... 244/145
[51] Int. Cl.² ...................................... B64D 17/12
[58] Field of Search ......... 244/145, 142, 152; 102/4

[56] References Cited
UNITED STATES PATENTS

| 2,483,423 | 10/1949 | Maggi | 244/145 |
|---|---|---|---|
| 3,218,007 | 11/1965 | Gross | 244/145 |
| 3,452,951 | 7/1969 | Wilson | 244/145 |

FOREIGN PATENTS OR APPLICATIONS

| 1,343,242 | 10/1963 | France | 244/145 |

Primary Examiner—Trygve M. Blix
Assistant Examiner—Barry L. Kelmachter
Attorney, Agent, or Firm—Dean E. Carlson; Dudley W. King; Richard E. Constant

[57] ABSTRACT

A parachute which may be dropped and deployed at high speeds and which will lift stores being carried by the parachute to an altitude near or above the initial drop altitude may include a canopy formed from concentric, circumferentially arranged ribbons in which the rearward facing portions of the canopy have a greater porosity than the remaining portions of the canopy. The greater porosity portion may be formed with ribbons narrower than the other ribbons or preferably with ribbons which assume an outwardly slanted relationship with respect to the normal inflated canopy curvature.

9 Claims, 9 Drawing Figures

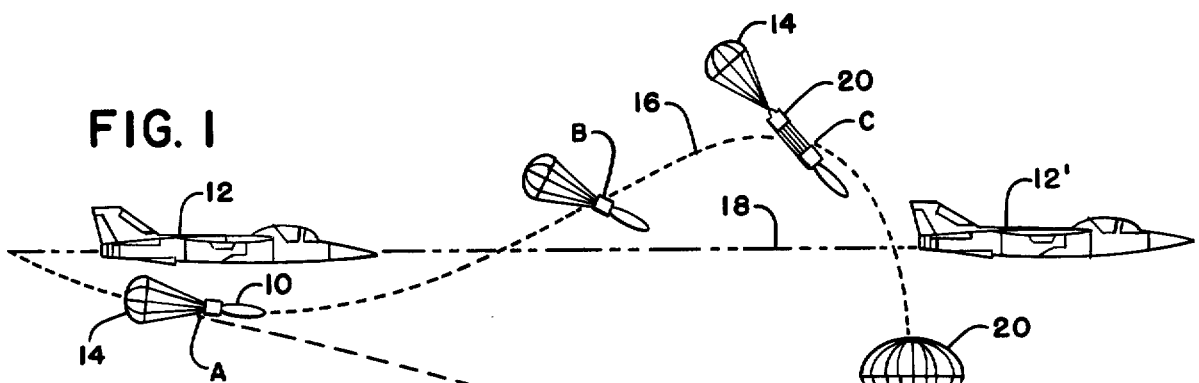
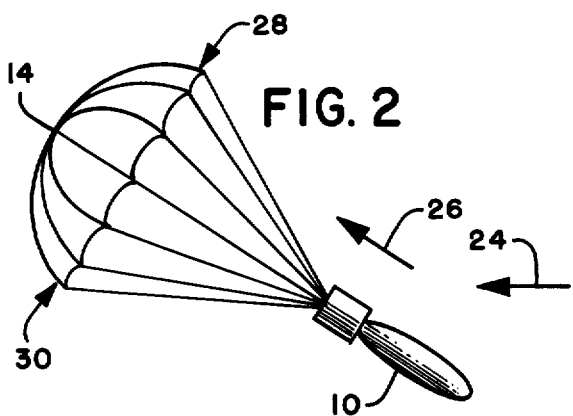
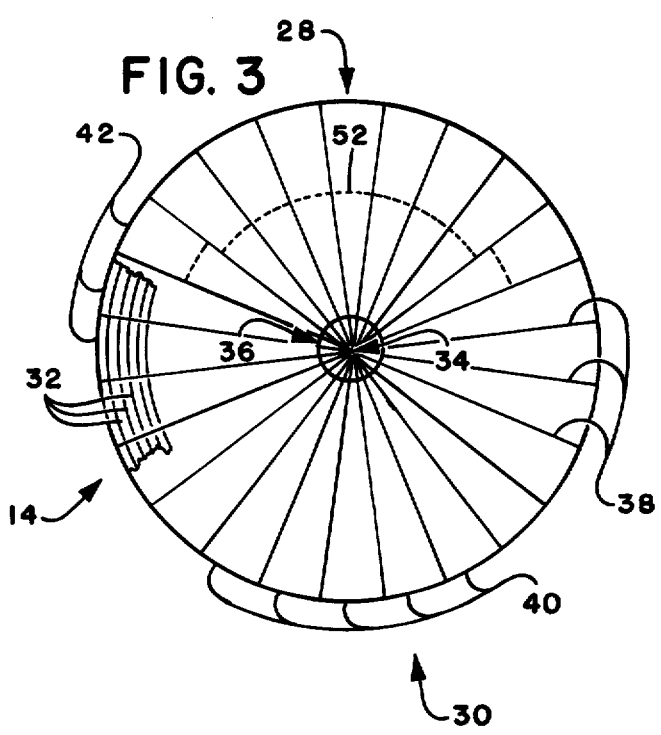
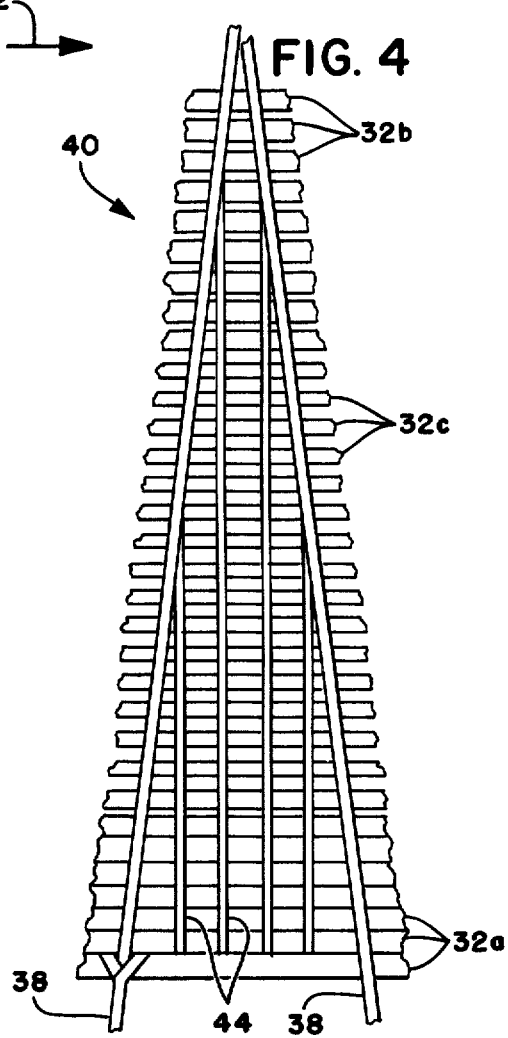

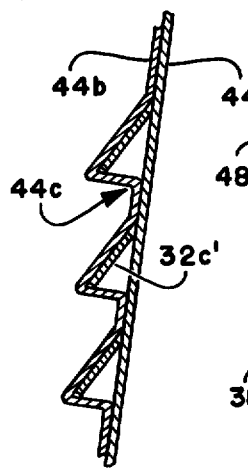
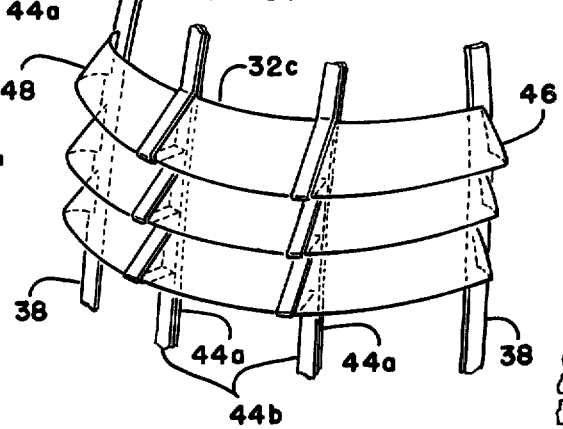
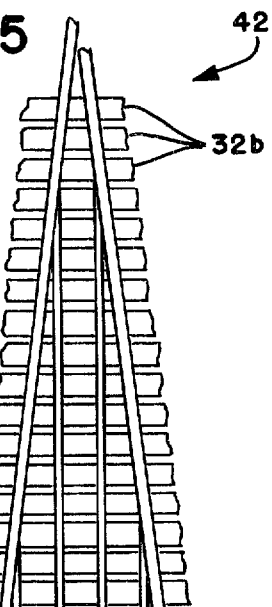
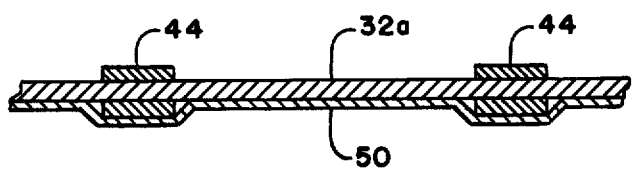
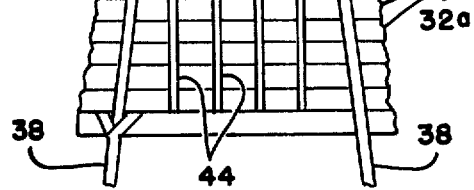
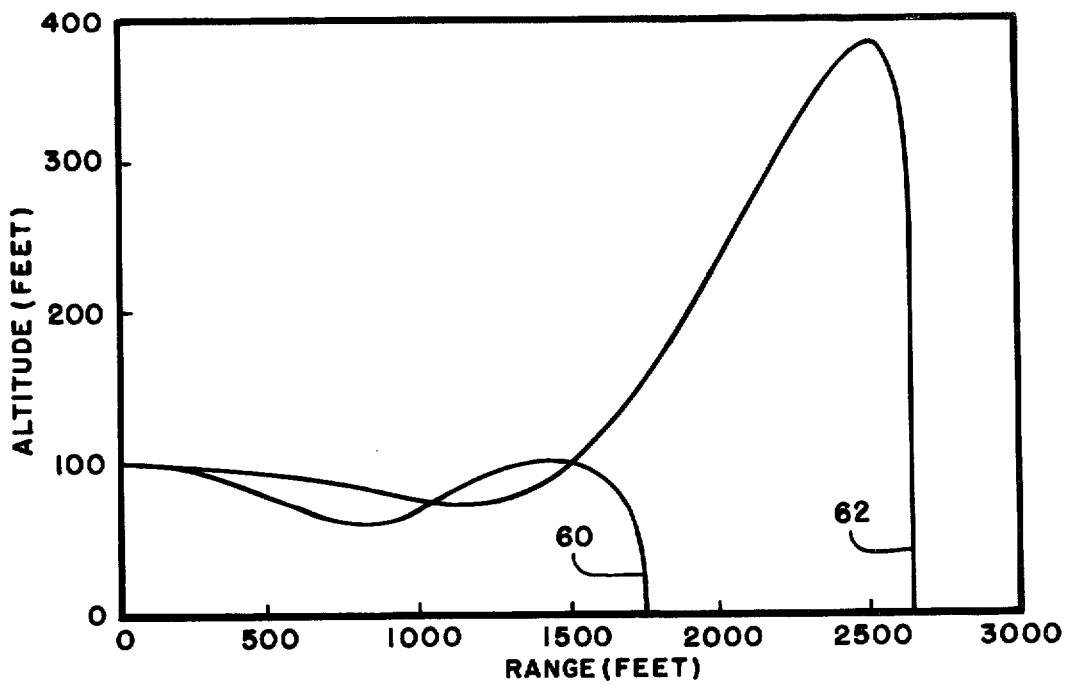

LIFTING PARACHUTE

BACKGROUND OF INVENTION

It is sometimes desirable to deliver or drop a store (for example some object or device like a munition) from an aircraft which is traveling at a high rate of speed at very low altitudes and then decrease the impact velocity and increase the impact angle of the store against the ground to levels at which the store may substantially survive the impact and also delay the time of impact as long as possible. It can be readily seen that as the release speed increases and the release altitude decreases, it becomes more difficult to achieve these objectives. For example, an unretarded object that is dropped from an altitude of 100 feet while traveling at a velocity of about mach 1 with an initial downward thrust of about 20 feet/second will impact the ground in about two seconds at substantially the some velocity and at an angle of less than about 5 degrees. It would be desirable for some systems, particularly when the object or store being dropped is a munition, that the store impact the ground at a velocity of less than about 60 feet/second at an angle greater than 50° to enhance survivability upon impact. It may also be desirable with other systems to remain in the air about 6 seconds or more after initial release. It is often desirable to achieve these conditions for initial store release velocities of from about mach 0.5 to about mach 1.4, that includes the transonic and low supersonic regimes.

Since forces on a parachute generally increase as the square of the deployment velocity, it can readily be seen that conventional free floating or gliding parachutes would be literally torn apart if they were deployed at these transonic and higher velocities. Prior ribbon-type parachutes can be deployed at these velocities but would not provide sufficient drag to provide the desired impact conditions in the available parachute volume. In addition, a ribbon-type parachute could not reduce the store velocity to a level at which a conventional parachute could be deployed in the limited drop and time conditions imposed upon a low altitude, high speed store release.

Prior attempts to overcome these problems and to achieve the desired impact conditions have attempted to increase the altitude of the store after initial release by provision of lifting wings or panels which are affixed to the store permanently or extended or deployed when the store is first dropped. In the first case, externally mounted wings may cause excessive drag on an aircraft or require inordinate space, and in the latter case require modification of existing stores to provide the extendable wings and complex mechanisms which add to the cost and weight of the stores. Winged systems also have the disadvantage for some applications of exhibiting low drag and thus a long trajectory which can increase dispersion and reduce accuracy.

SUMMARY OF INVENTION

In view of the above, it is an object of this invention to provide a novel parachute which may be deployed at high speeds and which may generate a lifting force to raise the parachute and the attached store above the altitude at which it is initially dropped and deployed.

It is a further object of this invention to provide a ribbon-type parachute capable of generating lift forces and survive the high parachute loads imposed by high release velocities.

It is a further object of this invention to provide a novel high speed, low altitude munition or other cargo delivery system.

Various other objects and advantages will appear from the following description of the invention, and the most novel features will be particularly pointed out hereinafter in connection with the appended claims. It will be understood that various changes in the details, materials and arrangements of the parts, which are herein described and illustrated in order to explain the nature of the invention, may be made by those skilled in the art.

The invention relates to a ribbon-type parachute which produces a lifting force when deployed at high speeds, the canopy including a portion of greater porosity and directed airflow in rearward facing sections thereof.

DESCRIPTION OF DRAWING

The invention is illustrated in the accompanying drawing wherein;

FIG. 1 is an illustration of a typical store trajectory and deployment from an aircraft using the lifting parachute of this invention;

FIG. 2 is a somewhat diagrammatic view of the lifting parachute and its load showing the relative position of the same with respect to various velocity and force vectors;

FIG. 3 is a somewhat simplified elevation view of the lifting parachute canopy layout of the present invention;

FIG. 4 is an elevation view of one of the rearward facing gores of the parachute canopy shown in FIG. 3;

FIG. 4a is a diagrammatic view showing details of lifting ribbons useable in the gore of FIG. 4;

FIG. 4b is a detailed perspective view of a lifting ribbon of FIG. 4a which shows the preferred shape of the ribbon;

FIG. 5 is an elevation view of one of the forward facing gores of the canopy shown in FIG. 3;

FIG. 5a shows a detail modification to a portion of the gores shown in FIG. 5 to decrease the skirt portion porosity; and FIG. 6 is a graph showing typical trajectories of a parachute system using the lifting paprachute of this invention in the manner illustrated in FIG. 1.

DETAILED DESCRIPTION

In the delivery of various stores by parachute from an aircraft, it is desirable that the store impact the earth surface at some impact velocity and angle which will minimize damage to the store and insure that the store achieves its desired purpose. As the altitude at which the aircraft initiates the drop decreases and as the speed of the aircraft increases, it often becomes difficult to achieve these conditions without excessively large and heavy parachutes particularly when the desired impact angle is such as greater than about 50° and impact velocity is less than about 100 feet/second from aircraft drop altitudes of around 100 feet with drop velocities in the transonic and low supersonic regimes. In addition, if the store being dropped is a munition, bomb or other high explosive which may be a danger to such low altitude aircraft when it strikes the earth and explodes, it is desirable that the store survive impact and be provided with extended time delay initiation mechanisms to delay weapon detonation after impact or that the delivery of the store to the detonation point be delayed as long as possible to permit the aircraft to travel a sufficient distance to be beyond the blast effects.

In the present invention, as shown in FIG. 1, a lifting parachute is employed having a first level of drag and which may open at high speeds and initially lift the store to an altitude above the aircraft drop altitude. The parachute will also simultaneously slow the velocity of the store to a speed at which a light weight second parachute having a significantly higher drag level can be opened to further slow the store to a desired impact velocity and angle. For example, shortly after the store has been dropped from aircraft 12, the high speed lifting parachute 14 of this invention may be deployed, such as at point A, so as to guide the store 10 along the trajectory indicated by the dotted line 16. The aircraft 12 may continue along its flight path 18 as the store is slowed and simultaneously lifted to a point above the flight path 18 level, such as to a point B, while the aircraft continues on to a position, such as shown at position 12'. At some location near the apogee at point C of trajectory 16 where the store 10 is approaching a desired attitude or angle and speed, the lifting parachute 14 may act to deploy a second, larger area and higher drag parachute 20 which slows the store to its final impact velocity and impact angle. As noted, the lifting parachute 14, because of the trajectory 16 which it acts to produce, aids in providing the desired impact angle. Without the effect of lifting parachute 14, store 10 may proceed along a trajectory 16', with or without the use of conventional parachutes. If it is desired, the initial loading of parachute 14 may be decreased by reefing the parachute when it is first deployed.

The store 10 and lifting parachute 14, as indicated in FIG. 2, assume an angle with respect to the velocity vector 22 and relative wind vector 24 which is a function of the direction and amplitude of the parachute force vector 26. This angle may typically be from about 10° to 30° degrees depending on the design of the lifting parachute. The trajectory of the parachute and store is a function of the amplitude of the velocity vector 22, which is directly related to the relative wind vector 24 amplitude, the weight of store 10, and the diameter and lift to drag ratio of parachute 14. The parachute 14, because of its characteristics, should be oriented with respect to the velocity vector 22 with a forward facing section 28 and a rearward facing section 30 at the same general vertically disposed location or attitude. This relationship may be maintained by the parachute 14 characteristics and with appropriate active or passive roll control mechanisms, such as fins and/or jets, on the store 10.

The lifting parachute 14 canopy layout, as shown in FIG. 3, is symmetrically arranged using a plurality of concentric circumferentially arranged ribbons 32. Only a portion of a few ribbons are shown, for purpose of illustration, around or adjacent the skirt of the parachute. The ribbons may be continuous around the parachute for maximum strength except in the slanted ribbon or high porosity area to be described below. The rows of ribbons 32 continue towards the center in a predetermined pattern, described below with respect to FIGS. 4 and 5, terminating at a central opening or vent 36. The canopy is divided into a plurality of gores or panels by radials or radial lines 38 which may continue to form the suspension lines from which the store may be suspended. The gores or panels 40 which make up the rearward facing section 30 of the lifting parachute 14 include an arrangement of greater porosity ribbons, as indicated in FIG. 4, while the remaining gores 42 include a lower porosity ribbon arrangement as indicated in FIG. 5.

The rearward facing gores 40 are provided with overall greater porosity than the remaining gores 42 and cover generally about 20 percent of the total surface area of the parachute 14 canopy. By way of comparison of gores 40 and 42, it can be seen that the rearward facing gores 40 and the remaining gores 42 each include a portion with ribbons 32a fastened or attached to the radials 38 adjoining each other in edge to edge manner adjacent to the skirt or outer circumference of the canopy. The gores 42 include more rows of ribbons disposed in edge to edge fashion than are found in gores 40 contributing to the porosity difference between the gores. The ribbons 32b which are adjacent to the vent 36 in both gores 40 and 42 are spaced apart the same distance to provide a greater porosity than that around the canopy skirt. The remaining ribbons in gores 42 are generally spaced the same distance apart as the inner or central ribbons 32b, whereas in gores 40, the intermediate ribbons 32c between the central portion and skirt portion are provided, effectively, with a greater porosity than any other portions of the inflated canopy. This greater porosity may be achieved, as shown in FIG. 4, by using narrower ribbons 32c than ribbons 32a and 32b or by providing ribbons 32c', as shown in FIGS. 4a and 4b, which assume an angle or are "slanted" with respect to the normal curvature of the inflated canopy to effectively provide larger gaps therebetween. These slanted ribbons act as many small airfoils which produce a directed airflow to enhance canopy stability and lift.

The ribbons 32, that is ribbons 32a, 32b and either 32c or 32c', may be sewn to intermediate, generally vertical strips or lines 44, referred to as verticals, between each pair of suspensions lines to provide additional reinforcing and ribbon shape control. In the case of the slanted ribbons 32c' in FIGS. 4a and 4b, these strips or verticals also function to provide the desired slant or angle for ribbons 32c'. For example, as in FIG. 4a, the verticals 44 include an inner segment 44a which follows the inner surface of the parachute canopy and an outer segment 44b overlying and coextensive to segment 44a and overlying the outer surface of the canopy. The outer segment 44b, in the case of gores 40, are longer than the inner segments 44a and the ribbons 32c' are sewn or attached only to the segments 44b. A portion of the segment 44b adjacent to the upper edges of ribbons 32c' may be sewn to segment 44a leaving a portion or length 44c of segments 44b adjacent the bottom edge of ribbons 32c' free for movement to permit the bottom edge of ribbons 32c' to be slanted away from the canopy curvature when the canopy is inflated. This angle may generally be from about 15° to about 45°.

In order to allow for a proper slant angle for each of ribbons 32c' along their length, the ribbons are cut symmetrically with a bottom edge a predetermined amount longer than the top edge and then attached to the radials 38 along the resulting end angle cut, as shown in FIG. 4b, by edges 46 and 48 of ribbon 32c'.

The steps of the slanted ribbons may be made by first sewing the outer vertical segments on the slanted ribbons with the ribbon spacing increased by the desired step size. Next the ribbon spacing is changed to its final spacing and the inner vertical segment and outer vertical segment are sewn together to form the step. The slanted cut at the ends of the slanted ribbon insures a proper slant angle throughout the length of the inflated slanted ribbon.

Using either of the embodiments shown in FIG. 4 or FIG. 4a, the porosity of the gores 40 are greater than that of gores 42, taking into consideration the greater porosity of the intermediate portions of gore 40 and the lower overall area covered by the low porosity skirt portion thereof.

The lifting action and resistance to collapse of parachute 14 may be further enhanced by placing a relatively low porosity liner or fabric along the inner surface of the canopy behind the already low porosity skirt portion of the forward facing gores thereof, as indicated by the outline 52 in FIG. 3 and the liner 50 in FIG. 5a. Liner 50 is preferably provided with excess fullness and shaped to follow ribbon contours so that the ribbons 32 carry the stresses produced by the liner. For convenience of manufacture, the liner may be provided with a shape approximating a segment of an annulus, as shown, having decreasing width at end portions thereof or otherwise shaped to provide the desired airflow in the canopy. The liner 50 acts to direct the airflow towards the rearward facing gores 40 to provide increased internal pressure at the leading edge of the parachute, prevent leading edge collapse, and further enhance the lifting forces and angle of the parachute 14. Liner 50 may cover from about 15 to 20 percent of the total surface area of the canopy and about 50 percent of the surface area of the forward facing gores. If desired, the ribbons adjacent liner 50 and the liner 50 itself may be replaced with a high strength, low porosity fabric covering the same area of the parachute.

The low porosity liner in the foreward facing gores of the canopy directs the airflow toward the porous rearward facing gores of the parachute to enhance lifting and to prevent leading edge collapse even when the parachute may swing past its stable lift position upon inflation. A further differential porosity is achieved by using the narrower ribbons or slanted ribbons in rearward facing gores of the parachute to cause the parachute to take a desired trim or lift angle. The slanted ribbons may look like partially opened venetian-type blinds, which, it has been found act as many small airfoils to direct the airflow out the back of the parachute to enhance the parachute lift characteristics and to improve the lateral stability of the parachute. Components and elements of lifting parachute 14 may be made of appropriate high strength, light weight fabrics or materials, for example, polyesters, polyamides or aromatic polyamides (some commerically available examples being such as Dacron, Nylon, Kevlar, respectively), depending on cost, strength, weight and temperature requirements. For example, tensile strengths of these materials may vary from about 100,000 to about 500,000 pounds/square inch and may weigh from about 0.04 to about 0.052 pounds/cubic inch.

A typical 14 foot diameter lifting parachute may include a total of 24 equally sized gores including 5 rearward facing gores and 9 forward facing gores provided with a low porosity liner around the skirt portion of the canopy. The 9 forward facing gores and the remaining 10 gores may include 13 ribbons attached in edge to edge fashion from the skirt and 21 ribbons spaced about 0.6 inch apart from these ribbons to the center hole. The liner may be symmetrically disposed around the 9 forward facing gore skirt with the liner shaped in a segmented annulus. The 5 rearward facing gores may include 6 ribbons attached in edge to edge fashion from the skirt, 20 slanted ribbons, and terminate toward the center with 7 equally spaced ribbons. Each of the ribbons may be about 2 inches wide.

The general arrangement of the ribbons described produces an internal pressure and a preferential airflow through the rearward facing gores 40 when the parachute and store are traveling at a high rate of speed and in an initial direction generally along the axis of the store and parachute and thus provide a lifting force to the parachute causing it to rotate into a position and lifting force direction as indicated in FIG. 2. This lifting force may be sufficient to raise the parachute and its load not only above the level at which the parachute canopy becomes inflated, but also above the initial drop altitude of the parachute and store in a completely passive system.

A store weighing about 2,400 pounds and having a downward ejection velocity of about 20 feet per second from an aircraft drop altitude of about 100 feet may achieve a trajectory using a two stage parachute system as illustrated in FIG. 6. The trajectory 60 may represent a store released at about mach 0.6 with an impact time from drop time of about 8 seconds. The trajectory 62 may represent a store released at about mach 1.2 impacting at about 12 seconds after initial drop. The initial deployment and line stretch of the lifting parachute may be about 0.7 second after store release from the aircraft and the second parachute may be deployed about 2.4 seconds after release from the aircraft. The opening time for the lifting parachute may be about 0.15 seconds while the opening time for the main 36 foot parachute may be about 1 second. The time interval from release of the first parachute to line stretch and the beginning of the opening of the second parachute may be about 0.3 seconds. Using a lifting parachute having a diameter of about 14 feet with an effective drag area of about 90 square feet and a lift-to-drag ratio of about 0.5, and a 36 foot diameter ringsail type parachute having an effective drag area of about 710 square feet and deployed at mach 0.6 at 100 feet altitude, an impact velocity of about 55 feet/second and an impact angle of almost 65° may be achieved about 7 seconds after drop. At mach 1.2 the impact velocity may be about 57 feet per second and the impact angle would be 89° about 12 seconds after drop.

A 700 pound store was dropped at speeds of mach 0.64 and mach 0.78 using a 10 foot diameter lifting parachute as described above. At the slower speed, after falling 30 feet from the initial release altitude, the store was lifted 16 feet above the release altitude while at the higher speed the lifting parachute lifted the store 146 feet above the release altitude. Using a 2400 pound store at a release velocity of about mach 0.68, a 14 foot diameter lifting parachute and a 36 foot diameter ring sail parachute second stage, the store was lifted about 50 feet above the initial release altitude and was slowed to a 58 foot per second impact velocity. When the store reached an altitude 100 feet below the initial release altitude, the store was traveling at a speed of 62 feet/second and was at an angle of 81°.

The lifting parachute described above, by proper selection of the porosity at the front of the parachute and the number of slanted ribbons or narrow ribbons may achieve lift-to-drag ratios of from about 0.2 to 0.6. The parachute may exhibit excellent stability, particularly with the slanted ribbons, with less than about 0.5° total oscillation in the lift direction and less than about 1° total oscillation in the lateral direction. It has been found that the lifting parachute with the lined leading edge has excellent resistance to leading edge collapse and may have a lift angle of more than 5 to 10° greater than its stable lift angle prior to any leading edge collapse. The symmetrical canopy arrangements is relatively easy to manufacture and provides a high strength construction which is able to survive the high parachute loads produced by high speed deployments with relatively equal suspension line stress. The step reinforced verticals and ribbons end shape in the slanted ribbons produce a controlled slanted ribbon angle and consistent and reproducible parachute lifting forces.

What is claimed is:

1. A lifting parachute for high speed release from an aircraft at from about mach 0.45 to about mach 1.2 comprising a canopy having a plurality of concentric circumferentially arranged ribbons generally spaced a uniform distance from one another adjacent the apex of said canopy and disposed in generally edge to edge relationship adjacent the canopy skirt, said canopy being divided into a plurality of gores by radial lines, said plurality of gores including rearward gores, side gores, and forward gores, said rearward gores of said canopy having a central portion intermediate the apex and skirt of said canopy of greater porosity compared to the porosity of the forward gores and the side gores with ribbons spaced further apart than the ribbons of said forward gores and the side gores when said canopy is inflated.

2. The parachute of claim 1 wherein the ribbons of said central portion of said rearward gores are narrower than the ribbons of said forward and side gores.

3. The parachute of claim 1 wherein the bottom edge of ribbons of said central portion of said rearward gores are outwardly spaced from the normal canopy curvature when said canopy is inflated to form slanted ribbons.

4. The parachute of claim 3 wherein said slanted ribbons are attached to said radial lines with said bottom edge longer than said upper edge.

5. The parachute of claim 4 wherein said rearward gores include a plurality of supporting elements intermediate said radial lines and extending generally parallel to each other, said supporting elements comprise a first segment along the inner surface of said canopy and a second segment longer than said first segment along the outer surface of said canopy, said ribbons of said central portion being equally spaced along and attached to said second segment with said second segment attached to said first segment adjacent the upper edge of said slanted ribbons and at a location spaced from the bottom edge of said slanted ribbons.

6. The parachute of claim 1 including a low porosity liner disposed along the inner surface of the forward gores of said canopy adjacent the skirt thereof.

7. The parachute of claim 6 wherein the surface area of said liner covers about 40 to 50 percent of each of the forward gores and about 20 to 25 percent of the total canopy surface area.

8. The parachute of claim 1 wherein the surface area of said rearward gores comprises about 20 percent and said greater porosity portion surface area comprises about 10 to 15 percent of the total canopy surface area.

9. The parachute of claim 1 wherein said plurality of gores are symmetrically divided into uniform gores by said radial lines.

* * * * *